(12) United States Patent
Dasch et al.

(10) Patent No.: US 8,875,147 B2
(45) Date of Patent: Oct. 28, 2014

(54) SCALABLE SYSTEM AND METHOD THEREOF

(75) Inventors: Thomas Dasch, Nürnberg (DE); Lutz Dominick, Eggolsheim (DE); Karlheinz Dorn, Kalchreuth (DE); Ivan Murphy, Baiersdorf (DE); Hans-Martin Von Stockhausen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1580 days.

(21) Appl. No.: 12/292,101

(22) Filed: Nov. 12, 2008

(65) Prior Publication Data

US 2010/0122252 A1 May 13, 2010

(51) Int. Cl.
  *G06F 9/455* (2006.01)
  *G06F 9/46* (2006.01)
  *G06F 9/50* (2006.01)
(52) U.S. Cl.
  CPC .................................. *G06F 9/5083* (2013.01)
  USPC ........................................................ 718/104

(58) Field of Classification Search
  None
  See application file for complete search history.

(56) References Cited

U.S. PATENT DOCUMENTS

| | | | |
|---|---|---|---|
| 7,877,355 B2 * | 1/2011 | Borgsmidt et al. | 707/616 |
| 2005/0102400 A1 * | 5/2005 | Nakahara et al. | 709/225 |
| 2006/0112390 A1 * | 5/2006 | Hamaoka | 718/102 |

* cited by examiner

*Primary Examiner* — Corey S Faherty
(74) *Attorney, Agent, or Firm* — Harness, Dickey & Pierce, P.L.C.

(57) ABSTRACT

A scalable system and method thereof may improve scalability and Quality of Service. The scalable system may include a first scalability adapter (scaldapter) configured to manage resource consumption of at least one component based on measured data received from the at least one component, where the component is configured to run an application, and a scalability manager (scalator) configured to modify strategies of the first scaldapter for managing the resource consumption based on measured data received from a plurality of processes, each of the plurality of processes including the first scaldapter.

28 Claims, 2 Drawing Sheets

SCALABLE SYSTEM AND METHOD THEREOF

BACKGROUND

Scalability and quality of service can be difficult to predict, preplan and technically build into a relatively large system, such as an enterprise platform. Design-to-cost, where a system may be pre-designed according a user's specifications, is not generally effective for scalability, as scalability is generally a technical guess for future requirements and cost prohibitive to anticipatorily design into a system.

For example, all resources in a system are limited, technical control over resource usage is even more limited, and work days may impose an inhomogeneous payload onto the system that is difficult to model and to solve technically in advance. Thus, there is generally an inherent contradiction between a preplanned technical scalability solution (and thus the predicted product's scalability) and the dynamic and unpredictable system behavior in real time, that cannot be adequately anticipated with conventional solutions. This can result in a conflict between different scalability demands and quality of service demands at run-time on one hand, and those scalability demands that were already built into the system on the other hand. Such conflict may result in resource cannibalism within the system, management difficulties for a human administrator, delays for the user, etc.

For instance, a system implemented in a medical center suffering from the above issues could result in potentially dangerous situations that would risk a patient's life.

When the system is in use, multiple components may be active that are not aware of each other's actions. For example, the resource limitation of computer systems and the downgrade of uptime qualities may occur whenever resources become too low or are not available. Resources on such a computer system are generally related to hardware and software. Reasons for such shortages may be the limits of hardware scalability, the number of processes and users, the amount of data to be processed, etc.

Conventional distributed, scalable systems may change run-time structures available and thereby, for example, maximize the uptime qualities of the system, such as availability and performance. However, the number of possible parameter variations of bottleneck situations in such conventional systems is generally too high for complete analysis, preplanning, testing, and human handling in the field.

Conventional systems have scalability solutions built in during the test-phase of a system, where a number of scalability requirements for users, processes, hardware, use cases are tried out. However, this trial and error approach is by nature an incomplete and limited analysis of run-time situations the system will encounter when deployed. Further, during the test-phase, it is assumed that the product will always meet payloads equivalent to those during the test. However, during run-time, the payload may exceed the product's capability.

Conventional scalability solutions are only based on select static parameters, such as by statically matching users and graphic cards, processes and CPUs, 3D image volume sizes and main memory.

Conventional scalability solutions are non-invasive in terms of a target system. For example, such solutions often assume homogenous payload, and treat the target system as a black box. Thus, conventional scalability solutions do not cooperate with the target system.

For example, the state of multiple tasks or processes in a conventional system may be aggregated from a plurality of monitors in the system. For example, a decision tree using one of green, yellow, red colors to indicate the status of individuals processes or tasks may be displayed, where the display is monitored by the human administrators. Accordingly, all actions have to depend on human consideration and decision, while watching the color scheme. Moreover, if the human administrator is not present to monitor the display, no action will take place regardless of color scheme. Monitoring rules may be established to take action according to, for example, the log message traffic and/or monitoring state. However, these actions are generic in nature and do not follow a strategy, for example, that takes into account business responsibilities or system capabilities. For example, in the conventional system, a monitoring rule may simply kill or disable a process based on a given state of the process, without taking into account states of the other processes. Moreover, all decisions and actions taken by the conventional system are of a local component scope, where a local component may be an application being used by a user. This is because automating actions in a conventional system beyond the local component scope would be considered dangerous and unreliable.

Conventional systems try to overcome the limitations of an automated local scope by using load balancers, which judge the overall state of a farm of machines and assign requests for program starts or data processing to one of the machines using, for example, the CPU load value and other parameters. For instance, the load balancers may schedule a next user request for a new program to start with a different machine. This decision is taken at system uptime. However, load balancers do not actively improve the state of the monitored machines using a multi-parameter proactive approach. Instead, load balancers assume that their load calculation model is correct, even if the model fails and overloads the machine. The consequences of the load calculation model, such as weak or good performance, are not predictable, but still they are taken as correct and valid input for the next scheduling step in conventional systems.

Conventional systems may also attempt garbage collection, which is a form a memory reallocation, at the local level to overcome the scalability limitations of an automated local scope. However, garbage collection can degrade the performance, and therefore the scalability, of the use cases temporarily and dramatically.

While conventional systems may be scalable, conventional systems are limited in their degree of scalability and not designed to improve scalability. For example, conventional systems may generally only operate within a local scope of actions or only minimally take into account a global scope when operating, where a global scope may incorporate the actions of multiples processes or components.

Therefore, conventional solutions are inflexible and obey each configured threshold individually. The conventional solutions do not judge each threshold in view of the entire set of thresholds even if the set of thresholds are related to each other. The standard mitigation for faulty threshold values in conventional systems is for the human administrator to manually repair the problem, where the same types of manual repairs may be carried out repeatedly because conventional solutions can not determine whether the current thresholds are correct or inadequate.

SUMMARY

According to an example embodiment, a scalable system may include a first scalability adapter (scaldapter) configured to manage resource consumption of at least one component based on measured data received from the at least one component, where the component is configured to run an application, and a scalability manager (scalator) configured to modify strategies of the first scaldapter for managing the resource consumption based on measured data received from a plurality of processes, each of the plurality of processes including the first scaldapter.

According to another example embodiment, a method of managing a scalable system may include managing resource consumption of at least one component based on measured data received from the at least one component, where the component runs an application, and modifying strategies of the managing resource consumption of at least one component based on measured data received from a plurality of processes, each of the processes including at least one of the managing resource consumption of at least one component.

According to yet another example embodiment, a computer-readable medium storing a computer program for managing at least one component of a scalable system in a component-oriented system, which when executed on a computer, may cause the computer to execute instructions including managing resource consumption of at least one component based on measured data received from the at least one component, where the component runs an application, and modifying strategies of the managing resource consumption of at least one component based on measured data received from a plurality of processes, each of the processes including at least one of the managing resource consumption of at least one component.

According to still another example embodiment, a scalable system includes means for managing resource consumption of at least one component based on measured data received from the at least one component, where the component runs an application, and means for modifying strategies of the managing resource consumption of at least one component based on measured data received from a plurality of processes, each of the processes including at least one of the managing resource consumption of at least one component.

BRIEF DESCRIPTION OF THE DRAWINGS

The above and other features and advantages will become more apparent by describing in detail example embodiments thereof with reference to the attached drawings in which.

DETAILED DESCRIPTION

Figure 1:
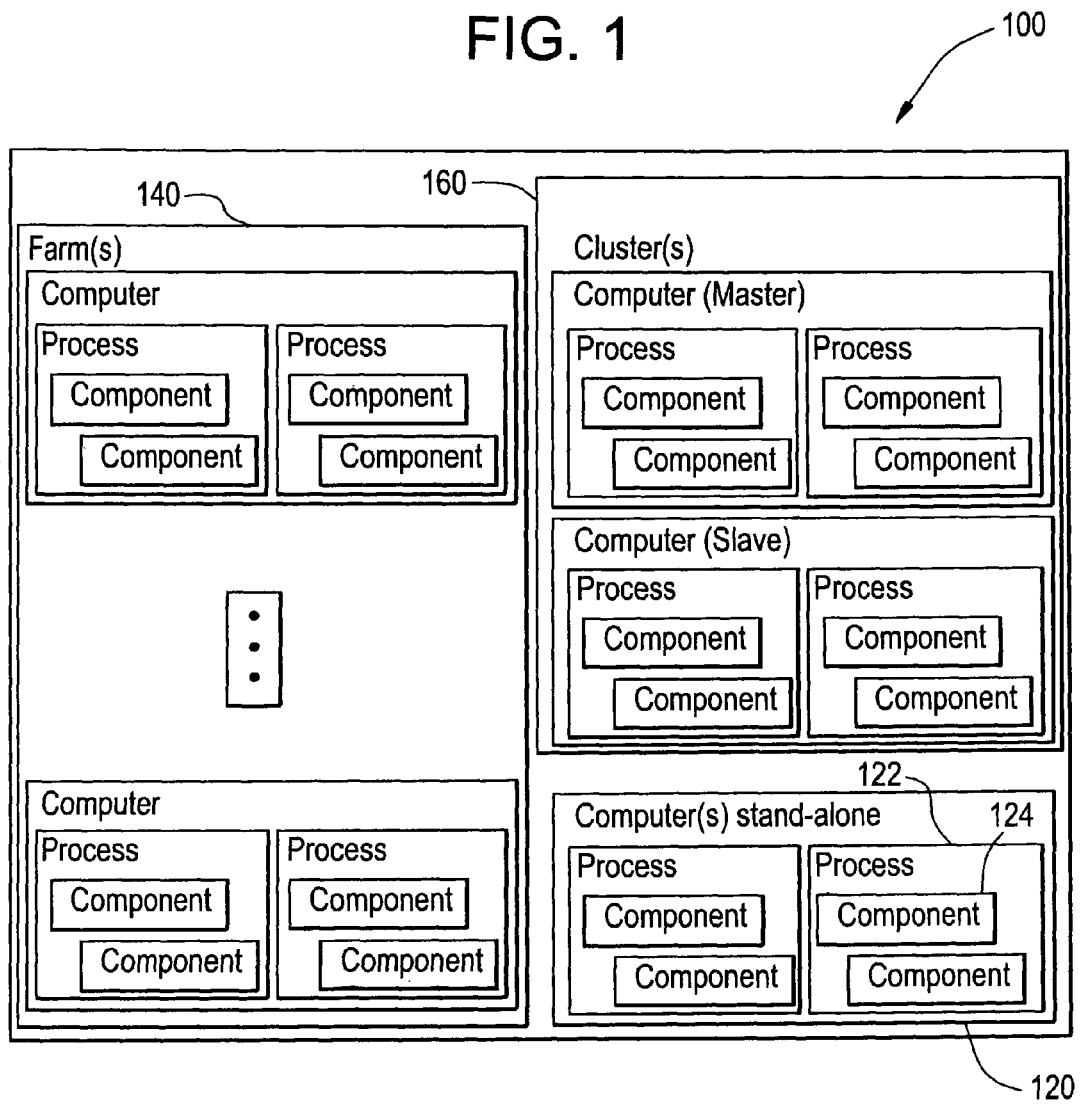
FIG. 1 is a block diagram illustrating an example of a target environment.

Various example embodiments will be described more fully with reference to the accompanying drawings, in which embodiments are shown. Example embodiments may, however, be embodied in many different forms and should not be construed as limited to the embodiments set forth herein. Rather, these embodiments are provided so that this disclosure will be thorough and complete, and will fully convey the scope of example embodiments to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures. The figures are intended to depict example embodiments and should not be interpreted to limit the intended scope of the claims. The accompanying figures are not to be considered as drawn to scale unless explicitly noted.

The terminology used herein is for the purpose of describing particular embodiments and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Specific details are given in the following description to provide a thorough understanding of example embodiments. However, it will be understood by one of ordinary skill in the art that example embodiments may be practiced without these specific details. For example, systems may be shown in block diagrams in order not to obscure example embodiments in unnecessary detail. In other instances, well-known processes, structures and techniques may be shown without unnecessary detail in order to avoid obscuring example embodiments.

Also, it is noted that example embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but could have additional steps not included in the figure. A process may correspond to a method, a function, a procedure, a subroutine, a subprogram, etc. When a process corresponds to a function, its termination may correspond to a return of the function to the calling function or the main function.

As disclosed herein, "scalability" may refer to a capability of a system to handle an increasing amount of tasks or to be readily enlarged to handle a greater number of tasks. Scalability may be a mixture of parameters, such as performance times and hardware resources, e.g. amount of main memory, disk space, network bandwidth, graphic board memory, etc, which are related to each other. Quality of service (QoS) may refer to any measurement for indicating system performance. For example, QoS may refer to resource reservation control mechanisms such as the ability to provide different priorities to different processes or users.

Also, as disclosed herein, a "process" managed by a scalable system may be an instance of a computer program or application, where instructions of the computer program or application may be run on a computer or processor. Additionally, "uptime" qualities may include availability and performance, usability, operability, serviceability, maintainability, interoperability, and non-functional qualities such as security and accessibility.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Example embodiments will now be described more fully with reference to the accompanying drawings.

FIG. 1 is a block diagram illustrating an example of a target environment 100. The target environment 100 may represent the system for which the scalable solution is being developed. Referring to FIG. 1, the target environment 100 includes one or more computers 120, server farms 140, and computer clusters 160. The computer cluster 160 may include a group of linked computers 120 working together. For example, the computer cluster 160 may include computers 120 having a master and slave relationship. The server farm may include a plurality of computers 120 and perform tasks beyond the capability of a single computer 120. Each computer 120 executes a process 122 and each process 122 includes one or more components 124. Here, a component 124 may be a software artifact or application such as a library, building block, subsystem, system, etc. The component may be configured to run a user application and/or offers a service or event to a user. Thus, each component may run in a process on a computer, which can be part of a farm, cluster, or stand-alone computer, in single site or multi-site enterprise scope.

Enterprise scope may be an organizing logic or framework within which different applications exchange data with one another as they participate in business processes of an enterprise or business having one or more interconnected sites, such as a medical facility having multiple centers that communicate and share data, applications and/or processing power. Process scope may be nested within the enterprise scope, and encompass the scope of the process 122 for a group of components 124 or applications that work together to provide a solution for a business need.

Component scope may be nested within the process scope, and encompasses the scope of single component 124 that runs a application or service. The outermost scopes generally involve planning and/or management of resources, while the innermost scopes generally involve execution of a user's request.

Figure 2:
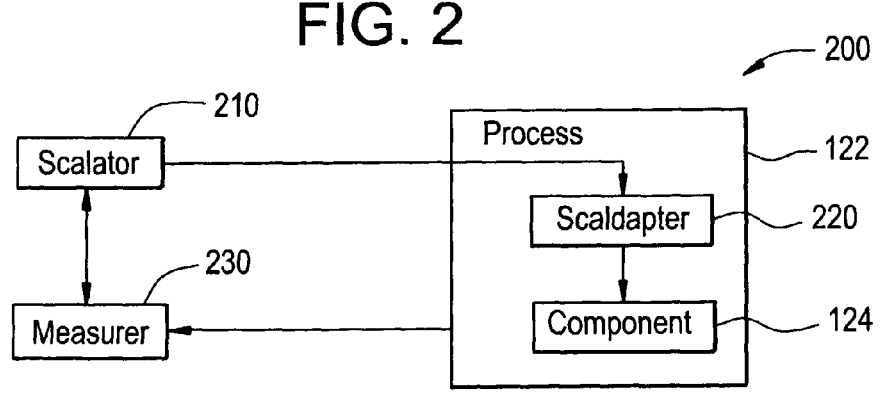
FIG. 2 is a block diagram of a scalable system according to an example embodiment.

FIG. 2 is a block diagram of a scalable system 200 according to an example embodiment. FIG. 2 includes a scalability manager scalator 210, a scalability adapter scaldapter 220, and a measurer 230. FIG. 2 also includes the process 122 and the component 124. Since the process 122 and the component 124 of FIG. 2 may be the same in operation as the process 122 and the component 124 of FIG. 1, respectively, similar features thereof will not be explained.

Referring to FIG. 2, the scalator 210 is configured to modify strategies of the scaldapter 220 for managing resource consumption of the component 124 based on measured data received from the process 122 including the scaldapter 220. For example, the scalator 210 may modify strategies of the scaldapter 220 by requiring the scaldapter 220 to meet certain parameters, suggesting guidelines that the scaldapter 220 can choose whether to follow, and/or switching to a different strategy. In the instance where the scalator 210 suggests guidelines to the scaldapter 220, the scalator 210 may work with the scaldapter 220 in a cooperative manner and/or the scaldapter 220 may independently decide to whether to accept any of the guidelines. However, it will be appreciated that the scalator 220 may manage other aspects of the scalable system 200 as well, such as a plurality of scaldapters 220. The scalator 210 may contact one or more scaldapters 220, locally or across the network, according to a current deployment configuration. The scalator 210 may submit a request to each of the scaldapters 220 to, for example, optimize or improve particular resource usage in their realm. These requests may be defined as part of strategies.

Figure 3:
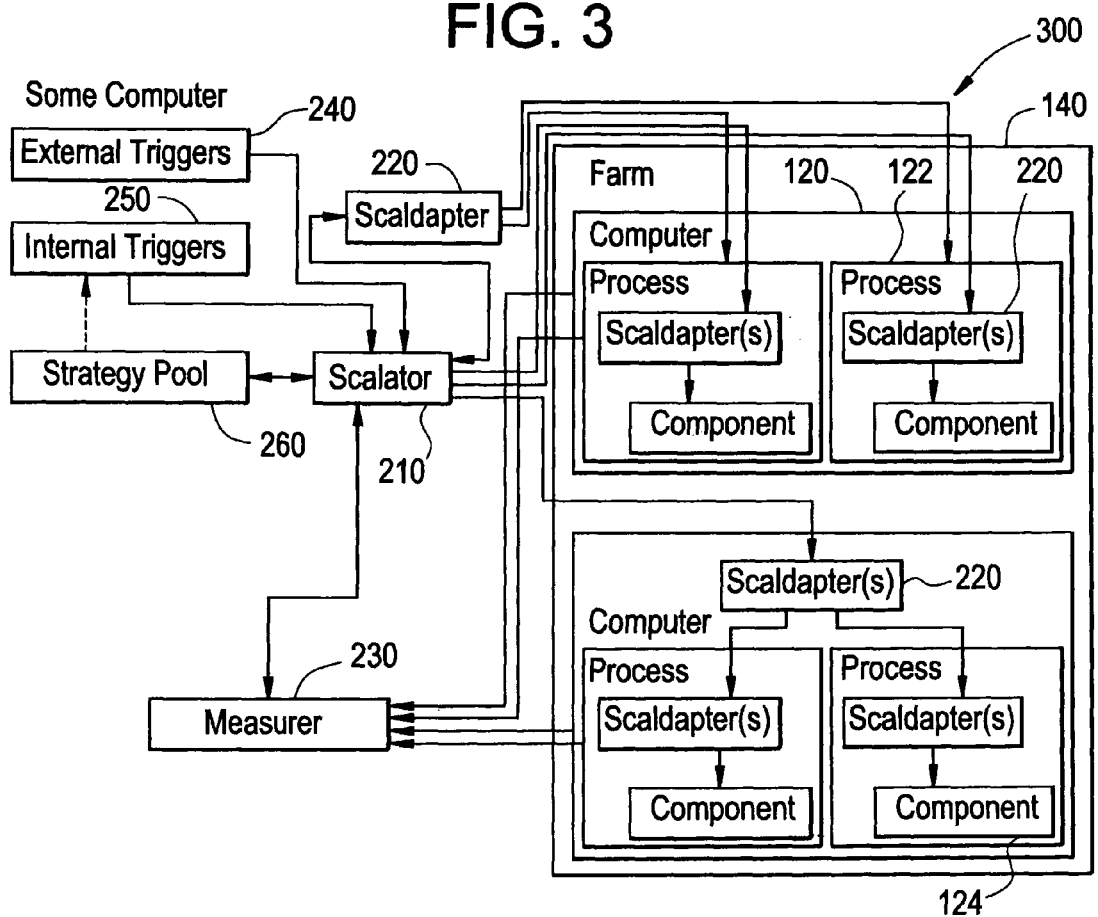
FIG. 3 is another block diagram of a scalable system according to an example embodiment.

The scaldapter 220 is configured to manage resource consumption of the component 124 based on measured data received from the component 124, where the component 124 is configured to run a user application. For example, the scaldapter 220 may adjust one or more parameters of the component 124 simultaneously to govern at least one of performance and resource consumption. However, it will be appreciated that the scaldapter 220 may manage other aspects of the scalable system 200 as well, such as the process 122 or another scaldapter 220, as shown in FIG. 3 below. Further, the scaldapter 220 may manage more than one aspect of the scalable system, such as a plurality of components 124, processes 122 or scaldapters 220. The scaldapter 220 may also manage resource consumption independently of input from the scalator 210. For example, the scaldapter 220 may make autonomous decisions, such as shrinking buffer size if no data is being received, when the scalator 210 is idle.

The component 124 acts as a resource consumer and may require scalability in relation to the enterprise scope. The scaldapter 220 allows for proactive scalability and performance management at run-time of the component 124. For example, the scaldapter 220 may call on the component 124 to adjust one or more parameters of the component 124 simultaneously. Such parameters may relate to memory allocation such as buffer and cache sizes; thread pool sizes; a running of internal processes such as rearranging, internal topology of processes or restarting processes; garbage collection of data; CPU load; data transfer rates; adjusting configurable thresholds; etc.

The scaldapter 220 may be related to one or more of the components 124. For example, the scaldapter 220 may govern the current performance and/or adjust/shrink the current resource consumption of one or more of the components 124 based on local strategies that are only applicable to a particular one or more of the components 124. The local strategies may include the full range of resource handling, such as unloading or suspending a resource consumer, unloading data from a resource consumer, shrinking buffer and cache sizes, shrinking thread pool sizes, adjusting configurable thresholds, re-arranging the topology and internal structure of running processes, restarting processes, garbage collection of data in memory and on disk, etc.

The measurer 230 is configured to execute diagnostic tasks on a measurement target. For example, the measurement target may be the target system of the scaldapters 220, where the target system includes the process 122. Referring to FIG. 2, the measurer 230 may be configured to execute diagnostic tasks to measure data from the process 122 and to send the measured data to the scalator 210. The measurer 230 may also receive triggers or event-driven tasks from the scalator 210 indicating when to measure at least one of the processes 122. However, it will be appreciated that the measurer 230 may measure data from a plurality of processes 200. Data is generally measured at a global scope in a coarse grained manner from one or more scaldapters 220. Conversely, data is generally measured at a local scope by the components 122. Measurement data may indicate resource usage, the ability to run particular use cases, health metrics, etc.

The scaldapter 220 may execute the strategies relatively quickly in response to a trigger from the scalator 210 such that the QoS is visibly improved for the user. For example, a five (5) second response time between the scalator 210 triggering a strategy and the scaldapter 220 executing the strategy may generally still be a timely response. However, a ten (10) second response time for triggering the strategy may generally not be considered a timely response. This is because a 5 second delay may visibly improve QoS to the user of the scalable system whereas a 10 second delay may not affect QoS to the user of the scalable system. Nonetheless, whether a response time is considered timely may vary according to a type of strategy being executed and scalable system being used. For instance, a 10 second response time may be considered a timely response for a specialized strategy where, for example, the measurer 230 is required to temporarily stop executing diagnostic tasks.

FIG. 3 is another block diagram of a scalable system 300 according to an example embodiment. FIG. 3 includes external triggers 240, internal triggers 250, and a strategy pool 260. FIG. 3 also includes the scalator 210, the scaldapter 220, the measurer 230, the computer 120, the process 122, the component 124, and the server farm 140. Since the scalator 210, the scaldapter 220, the measurer 230, the computer 120, the process 122, the component 124, and the server farm 140 of FIG. 3 may be the same in operation as the scalator 210, the scaldapter 220, the measurer 230, the computer 120, the process 122, the component 124, and the server farm 140 of FIGS. 1 and 2, respectively, similar features thereof will not be explained.

A trigger to initiate the local strategies for resource handling may be generated outside or inside the scaldapter 220, based on trigger policies. The trigger policies may be based on measurements of use case performance and/or hardware and software properties, timers, or arbitrary events. Strategies and triggers may be dynamically configurable. The strategies may indicate which information to measure and where the information may be acquired, such as from an operating system or proprietary information sources.

Referring to FIG. 3, the scalator 210 may be triggered from outside through the external trigger 240 to provide more scalability, for example, by allowing another user on the application server, or to improve run-time qualities. The external trigger 240 may be any trigger that is executed from outside the scalator 210, such as by a system administrator or another component within the scalable system 300. The scalator 210 may also execute its own triggers internally through the internal trigger 250 to keep the scalator's 210 realm clean in terms of runtime qualities, such as optimizing or improving performance and memory footprint. Either the internal triggers 250 or the external triggers 240 may rely on a selected set of run-time data, events, etc.

The strategy pool 260 is configured to store the strategies that form the knowledge base of the scalator 210. In addition, the strategy pool 260 may also be configured to store measurement data that has been processed by the scalator 210. Optionally, the strategy pool 260 may also store triggers transmitted to the scalator 210 and/or the scaldapters 220 through the scalator 210. The strategy pool 260 may also send stored triggers to the scalator 210 either directly or optionally, through the internal triggers 250.

Moreover, the strategies of the strategy pool 260 may be readily interchanged or dynamically modified. For example, the strategy pool may be further configured with plug-ins to dynamically modify and interchange the strategies, where the plug-ins may include program code. The strategy pool 260 may be dynamically loaded with the plug-ins and the scalator 210 may then execute the plug-ins. The plug-ins may, for example, alter which data is measured by the measurer 230 and how the data is calculated and/or evaluated by the scalator 210 for different strategies. Moreover, each strategy may be implemented differently by each of the scaldapters 220.

The measurer 230 may execute diagnostic tasks periodically, for example, based on the strategies from the strategy pool 260 and/or triggers from the internal or external triggers 240 and 250 through the scalator 210.

In example embodiments, during preplanning of the scalable system, only coarse grained scalability parameters are arranged for generally obvious calculations that are based on relatively static constraints that can be decided up-front, and which are made to fit a with deign-to-cost strategy. For example, coarse grained scalability parameters may include load/save performance times for images based on previously known measurements. At run-time, the scalator 210 may make detailed arrangements that cannot be pre-calculated and that undergo situation specific changes during run-time.

Before shipment, a system integration test may install the strategies that fit best with the customer site. Later, product installation may be adjusted, based on the history logs of the scalator 210, because such a log will indicate which parameters were or were not effective.

In example embodiments, the scalable solution may support existing techniques for load balancing, monitoring, local garbage collection, schedulers, workflow engines, etc, Further, the scalable solution may add the ability for global, automatic, proactive, coordinated, optionally invasive and timely coordinated actions for better scalability and QoS. Overall, QoS of the system may be improved by the scalable solution by providing better performance, more efficient resource usage and/or faster response times.

Example embodiments may improve scalability by solving multi-factor based situations in a controlled manner where all scaldapters 220 may adjust resource consumption simultaneously. Thus, resource usage and system bottlenecks may be reduced.

For example, assume a new user wants to use an application server and the configured threshold is limited to five (5) users to limit a memory footprint. Conventional solutions may monitor users at a local scope, such as per application or per service, and not at a global scope. Thus, in a conventional solution, the new user could attempt to use the application server and run into a deadlock due to unavailable resources or perceived poor performance. However, in the scalability solution according to example embodiments, the scalator 210 may recognize the new user now and trigger the one or more scaldapters 220 to optimize or improve the resource consumption in general if measurement data is below thresholds. Alternatively, the scalator 210 may be triggered that the new user wants to perform a critical task. In such cases, the scalator 210, may check if corrective action may be taken, such as running a strategy that matches six (6) users against the currently visible resource consumption profile, which is available from the application server machines with standard means and which contains all necessary quotas from the preplanning phase. Then, if the match fails, the scalator 210 may request proactive local action, such as scalability optimization, and measure the effect globally. If the scalator 210 is successful, the new user may enter the application server. Alternatively, a simpler strategy for fulfilling the request from the scalator 210 may be for one of the scaldapters 220 to suspend or shut down inactive users.

According to another example, an application server may reach a dangerous operating state or become unavailable, due to a combination of uptime parameters such as too high a CPU load, a number of processes exceeding the resource threshold, or a high memory footprint. In such as case, either the measurer 230 or another external monitor may understand that there is a dangerous situation that will result in weak perceived system performance. The scalator 210 may now trigger the scaldapters 220 to reduce resource usage, for example, by reducing caches from 250 MB to 50 MB, by avoiding parallel background jobs, by clearing the reuse pools, by reducing thread pools, or based on configurable strategies and configurable local actions that the scaldapters 220 execute in their scope on the components that they maintain.

Figure 4:
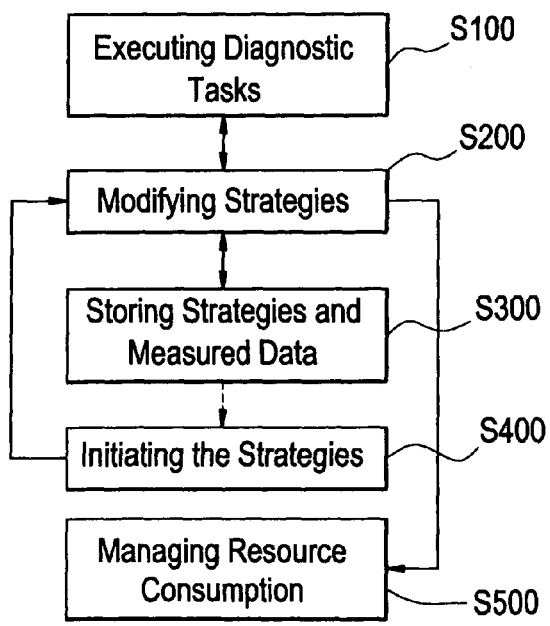
FIG. 4 is a flow diagram illustrating a method of managing a scalable system.

FIG. 4 is a flow diagram illustrating a method of managing a scalable system. The method of FIG. 4 may be performed in conjunction with the example embodiments of FIGS. 2 and/or 3.

At S100, the measurer 230 may execute diagnostic tasks to measure data from at least one of the plurality of processes and may send the measured data to modifying S200.

At S200, the scalator 210 may modify strategies of managing S500 based on at least one of measured data received from the executing S100 or triggers received from initiating S400 and/or optionally, storing S300. The modifying S200 may also trigger the executing S100 and transmit the measured data from the executing S100 to the storing S300.

At S300, the strategy pool 260 may store the strategies and the measured data. The storing S300 may also trigger the managing S500 and/or the executing S100 through the modifying S200. Optionally, the storing S300 may route additional triggers through the initiating S400.

At S400, internal and external triggers 240 and 250 may initiate the strategies through the modifying S200. The initiating may be based on at least one of measurements of use case performance, hardware properties, software properties, timers, and system events.

At S500, scaldapters 220 may manage resource consumption of at least one component 124 or at least one process 122 based the modifying S200.

Thus, a scalable solution according to example embodiments may reduce servicing time of a scalable system for both the manufacturer and the customer or user. In addition, service level agreements (SLA) may be fulfilled, or at the very least, there may now be history logs available that show that the initial solution was faulty.

According to example embodiments, a Total Cost of Ownership (TCO) may decrease due to an increase in the number of automated actions and thus, manual actions from a human administrator may decrease. Design-to-Cost may also be improved because the manufacturer may measure and store the successful configuration profiles and strategies before product shipment. This may be done in combination with automatic testing. Such approaches may reduce the need for manual optimizations of the scalable system at the customer site.

In example embodiments, the scalator 210 may improve the state and reliability of hardware and software load balancers by triggering load balance decisions based on resource consumption decisions in view of global measurement data and strategies. Thus, the load balance decisions are not just based on local measurement data, thus allowing for decisions that are more reliable.

The scalator 210 may mitigate the problems of preplanning scalability by removing the need to know all run-time details in advance, which is not generally feasible for multi-user and enterprise environments.

The scalator 210 may balance the QoS among its related components 124, and not only the load of the machines. The scaldapters 220 may leverage currently unused resource, and restrict resource usage down to a configurable threshold for a time period, which may improve a stability and quality of service also of other components. Scaldapters 220 also may re-acquire more memory, such as by increasing cache size again upon request or at a later point in time again. Scaldapters 220 may be nested and may form a tree structure with separate strategies for each scaldapter 220, thus allowing for real-time like local decisions in example embodiments.

Example embodiments provide a scalable solution that allows for altering the scalability of a distributed system at run-time in a controlled manner with predictable results.

In example embodiments, the scalable solution may implement and automatically trouble-shoot workflows by learning which adjustments lead to improved system performance based on dynamically incorporating feedback from the system during run-time into the decision-making process, for example to create a dynamically prioritized strategy list.

According to example embodiments, the scalable solution may automate activity that is conventionally bound to a human administrator by triggering a decision to take action, performing the action, and controlling the results.

Example embodiments not only measure and monitor resource consumption but actively influence and cooperate with the system in non-destructive working scheme to improve resource consumption efficiency. In addition, the strategies in the strategy pool may be continuously updated and improved to increase uptime of the system.

The scalability solution according to example embodiments allows the application to recognize effective and ineffective actions for house-keeping in a proactive, flexible, configurable, and automatic manner.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A scalable system comprising:
at least one processor configured to execute a plurality of processes, each of the plurality of processes including,
a first scalability adapter (scaldapter), the first scaldapter configured to manage resource consumption of at least one component based on measured data received from the at least one component, where the component is configured to run an application; and
a scalability manager (scalator) configured to modify strategies of the first scaldapters for managing the resource consumption based on measured data received from the plurality of processes.

2. The system of claim 1, wherein each of the plurality of processes further includes the at least one component and each of the plurality of processes is executed on a computer.

3. The system of claim 2, further comprising:
a second scaldapter configured to manage resource consumption of at least one of the plurality of processes, wherein
the scalator is configured to modify strategies of the second scaldapter for managing the resource consumption based on measured data received from the at least one of the plurality of processes.

4. The system of claim 2, wherein the first scaldapter adjusts one or more parameters of the at least one component simultaneously to govern at least one of performance and resource consumption.

5. The system of claim 2, wherein the computer is included in at least one of a server farm and a computer cluster.

6. The system of claim 1, further comprising:
a strategy pool configured to store the strategies and the measured data, wherein
the strategies are at least one of dynamically modifiable and interchangeable.

7. The system of claim 6, wherein,
the strategy pool is further configured with at least one plug-in to dynamically modify and interchange the strategies, where the at least one plug-in includes program code, and wherein
the strategy pool is loaded with the at least one plug-in and the scalator executes the at least one plug-in.

8. The system of claim 6, further comprising:
a measurer configured to execute diagnostic tasks to measure data from at least one of the plurality of processes and to send the measured data to the scalator, wherein
the measurer is triggered in response to the scalator.

9. The system of claim 1, further comprising:
at least one trigger configured to initiate the strategies for the resource consumption, wherein
the strategies are initiated based on at least one of measurements of use case performance, hardware properties, software properties, timers, and system events.

10. The system of claim 1, wherein the scaldapter executes one or more of the strategies in response to a trigger from the scalator such that Quality of Service (QoS) is visibly improved for a user.

11. A method of managing a scalable system including a plurality of processes, each of the plurality of processes including at least one component, the method comprising:
managing resource consumption for each component based on measured data received from the at least one component, where the component runs an application; and
modifying strategies of the managing resource consumption for each component based on measured data received from the plurality of processes.

12. The method of claim 11, further comprising:
managing resource consumption of at least one of the plurality of processes, wherein
the modifying modifies strategies of the managing resource consumption of at least one of the plurality of processes based on measured data received from at least one of the plurality of processes.

13. The method of claim 11, wherein the managing resource consumption of at least one component adjusts one or more parameters of the at least one component simultaneously to govern at least one of performance and resource consumption.

14. The method of claim 11, further comprising:
storing the strategies and the measured data, wherein
the strategies are at least one of dynamically modifiable and interchangeable.

15. The method of claim 14, wherein,
the storing includes at least one plug-in to dynamically modify and interchange the strategies, where the at least one plug-in includes program code, and wherein
the storing is loaded with the at least one plug-in and the modifying executes the at least one plug-in.

16. The method of claim 14, further comprising:
executing diagnostic tasks to measure data from at least one of the plurality of processes and to send the measured data to the modifying, wherein
the executing is triggered in response to the modifying.

17. The method of claim 11, further comprising:
initiating the strategies for the modifying, wherein
the strategies are initiated based on at least one of measurements of use case performance, hardware properties, software properties, timers, and system events.

18. The method of claim 11, wherein the managing executes one or more of the strategies in response to a trigger from the modifying such that Quality of Service (QoS) is visibly improved for a user.

19. A scalable system, comprising:
at least one processor configured to execute a plurality of processes, each of the plurality of process including,
means for managing resource consumption of at least one component based on measured data received from the at least one component, where the component runs an application; and
means for modifying strategies of the managing resource consumption of at least one component based on measured data received from the plurality of processes.

20. A non-transitory computer-readable medium storing a computer program for managing a plurality of processes, each of the plurality of processes including at least one component, of a scalable system in a component-oriented system, which when executed on a computer, causes the computer to execute instructions comprising:
managing resource consumption for each component based on measured data received from the at least one component, where the component runs an application; and
modifying strategies of the managing resource consumption for each component based on measured data received from the plurality of processes.

21. The non-transitory computer-readable medium of claim 20, wherein each of the plurality of processes further includes the at least one component.

22. The non-transitory computer-readable medium of claim 21, further comprising:
managing resource consumption of at least one of the plurality of processes, wherein
the modifying modifies strategies of the managing resource consumption of at least one of the plurality of processes based on measured data received from the at least one of the plurality of processes.

23. The non-transitory computer-readable medium of claim 21, wherein the managing resource consumption of at least one component adjusts one or more parameters of the at least one component simultaneously to govern at least one of performance and resource consumption.

24. The non-transitory computer-readable medium of claim 20, further comprising:
storing the strategies and process measurement data, wherein
the strategies are at least one of dynamically modifiable and interchangeable.

25. The non-transitory computer-readable medium of claim 24, wherein,
the storing includes at least one plug-in to dynamically modify and interchange the strategies, where the at least one plug-in includes program code, and wherein
the storing is loaded with the at least one plug-in and the modifying executes the at least one plug-in.

26. The non-transitory computer-readable medium of claim 24, further comprising:
executing diagnostic tasks to measure data from at least one of the plurality of processes and to send the measured data to the modifying, wherein
the executing is triggered in response to the modifying.

27. The non-transitory computer-readable medium of claim 20, further comprising:
initiating the strategies for the modifying, wherein
the strategies are initiated based on at least one of measurements of use case performance, hardware properties, software properties, timers, and system events.

28. The non-transitory computer-readable medium of claim 20, wherein the managing executes one or more of the strategies in response to a trigger from the modifying such that Quality of Service (QoS) is visibly improved for a user.

\* \* \* \* \*